(12) United States Patent
Kim et al.

(10) Patent No.: US 7,710,074 B2
(45) Date of Patent: May 4, 2010

(54) DETERMINING AN AMOUNT OF CHARGE IN A BATTERY BASED ON VOLTAGE AND PORTABLE DEVICE HAVING THE SAME

(75) Inventors: Young Hoon Kim, Songpag-gu (KR); Sun Woo Park, Anyang (KR)

(73) Assignee: LG Electronics Inc., Seoul (KR)

( * ) Notice: Subject to any disclaimer, the term of this patent is extended or adjusted under 35 U.S.C. 154(b) by 524 days.

(21) Appl. No.: 11/531,243

(22) Filed: Sep. 12, 2006

(65) Prior Publication Data

US 2007/0090804 A1 Apr. 26, 2007

(30) Foreign Application Priority Data

Oct. 14, 2005 (KR) .................. 10-2005-0097185
Nov. 16, 2005 (KR) .................. 10-2005-0109838
Nov. 21, 2005 (KR) .................. 10-2005-0111451

(51) Int. Cl.
*H02J 7/00* (2006.01)
(52) U.S. Cl. ..................... 320/132; 324/427
(58) Field of Classification Search .......... 320/132; 324/427, 428–436

See application file for complete search history.

(56) References Cited

U.S. PATENT DOCUMENTS

| | | | | |
|---|---|---|---|---|
| 3,970,912 A | * | 7/1976 | Hoffman | 320/114 |
| 5,994,877 A | * | 11/1999 | Seri et al. | 320/132 |
| 6,054,861 A | * | 4/2000 | Takahashi | 324/428 |
| 6,157,165 A | * | 12/2000 | Kinoshita et al. | 320/116 |
| 6,335,611 B1 | * | 1/2002 | Sasaki | 320/134 |
| 6,891,355 B2 | * | 5/2005 | Kernahan | 323/282 |
| 2005/0024018 A1 | * | 2/2005 | Ikeda | 320/132 |

* cited by examiner

*Primary Examiner*—Edward Tso
*Assistant Examiner*—Samuel Berhanu
(74) *Attorney, Agent, or Firm*—Fish & Richardson P.C.

(57) ABSTRACT

Residual charge in a battery is measured based on a discharge voltage from the battery. A device for measuring the residual charge in the battery includes a fluctuation width amplifier configured to amplify a fluctuation width of a discharge voltage from the battery in excess of a threshold voltage. The device includes a display module configured to display the discharge voltage amplified by the fluctuation width amplifier. The discharge voltage amplified by the fluctuation width amplifier corresponds to the residual charge in the battery. The residual charge in the battery may be determined based on the discharge voltage and the application load data due to an operative application program.

50 Claims, 10 Drawing Sheets

| discharge voltage of battery pack | digital discharge voltage data | application load amount | |
|---|---|---|---|
| | | 50% less | 50% more |
| 4.20 ~ 3.70 | 4.00 ~ 2.50 | 85 more | 85 more |
| 3.70 ~ 3.50 | 2.50 ~ 1.90 | 85 ~ 70 | |
| 3.50 ~ 3.40 | 1.90 ~ 1.60 | 70 ~ 60 | 85 ~ 70 |
| 3.40 ~ 3.35 | 1.60 ~ 1.45 | 60 ~ 50 | |
| 3.35 ~ 3.30 | 1.45 ~ 1.30 | 50 ~ 40 | 70 ~ 60 |
| 3.30 ~ 3.25 | 1.30 ~ 1.15 | 40 ~ 30 | 60 ~ 50 |
| 3.25 ~ 3.20 | 1.15 ~ 1.00 | 30 ~ 20 | 50 ~ 40 |
| 3.20 ~ 3.00 | 1.00 ~ 0.50 | 20 less | 40 ~ 30 |

{ amount of charge in battery pack amount of charge in battery pack

FIG. 5

| discharge voltage of battery pack | digital discharge voltage data | amount of charges in battery pack |
|---|---|---|
| 4.20 ~ 3.70 | 4.00 ~ 2.50 | 85 more |
| 3.70 ~ 3.50 | 2.50 ~ 1.90 | 85 ~ 70 |
| 3.50 ~ 3.40 | 1.90 ~ 1.60 | 70 ~ 60 |
| 3.40 ~ 3.35 | 1.60 ~ 1.45 | 60 ~ 50 |
| 3.35 ~ 3.30 | 1.45 ~ 1.30 | 50 ~ 40 |
| 3.30 ~ 3.25 | 1.30 ~ 1.15 | 40 ~ 30 |
| 3.25 ~ 3.20 | 1.15 ~ 1.00 | 30 ~ 20 |
| 3.20 ~ 3.00 | 1.00 ~ 0.50 | 20 less |

| discharge voltage of battery pack | digital discharge voltage data | application load amount | |
|---|---|---|---|
| | | 50% less | 50% more |
| 4.20 ~ 3.70 | 4.00 ~ 2.50 | 85 more | 85 more |
| 3.70 ~ 3.50 | 2.50 ~ 1.90 | 85 ~ 70 | |
| 3.50 ~ 3.40 | 1.90 ~ 1.60 | 70 ~ 60 | 85 ~ 70 |
| 3.40 ~ 3.35 | 1.60 ~ 1.45 | 60 ~ 50 | |
| 3.35 ~ 3.30 | 1.45 ~ 1.30 | 50 ~ 40 | 70 ~ 60 |
| 3.30 ~ 3.25 | 1.30 ~ 1.15 | 40 ~ 30 | 60 ~ 50 |
| 3.25 ~ 3.20 | 1.15 ~ 1.00 | 30 ~ 20 | 50 ~ 40 |
| 3.20 ~ 3.00 | 1.00 ~ 0.50 | 20 less | 40 ~ 30 | amount of charge in battery pack amount of charge in battery pack

DETERMINING AN AMOUNT OF CHARGE IN A BATTERY BASED ON VOLTAGE AND PORTABLE DEVICE HAVING THE SAME

BACKGROUND

This description relates to measuring an amount of charge remaining in a battery.

A battery is typically used as a power source for various portable electronic devices, such as a portable phone, a portable digital assistant (PDA) device, a notebook computer, a portable game player, a digital camera, an MP3 player, and/or a portable multimedia player (PMP).

In the case of a rechargeable battery, the rechargeable battery may be damaged or the life span thereof may be reduced if the battery is excessively recharged or discharged. In order to determine the amount of available charge, an amount of charge in a battery is often measured according to a battery gauge integrated circuit chip or voltage measurement technique. Specifically, a first technique for measuring an amount of charge in a battery includes measuring an amount of charge in a battery using a battery gauge integrated circuit (IC) chip. A second technique for measuring an amount of charge in a battery is based on only a voltage of the battery. The method for measuring an amount of charge in a battery using a battery gauge IC chip allows for the measurement of an amount of charge in a battery based on several conditions, such as the change of a chemical characteristic in a battery, as well as the size, the current, and the voltage of the battery. Although the battery gauge IC chip technique provides accurate and reliable measurement of an amount of charge in a battery, the gauge IC chip used for measurement and/or display may be relatively expensive. In contrast, although the measurement technique based on a voltage of a battery may not be as reliable or accurate as the battery gauge IC chip technique, the circuitry for performing the voltage measurement technique is relatively inexpensive.

SUMMARY

In one general aspect, an apparatus for measuring residual charge in a battery includes a fluctuation width amplifier configured to amplify a fluctuation width of a discharge voltage from the battery in excess of a threshold voltage. A display module is configured to display the discharge voltage amplified by the fluctuation width amplifier. The discharge voltage amplified by the fluctuation width amplifier corresponds to the residual charge in the battery.

Implementations may include one or more of the following features. For example, the display module may include a display element.

The device may include an analog to digital converter configured to convert the discharge voltage having the fluctuation width amplified by the fluctuation width amplifier into digital discharge voltage data. The device may include a driving unit configured to display the digital discharge voltage data from the analog to digital converter on the display element as the residual charge in the battery.

The fluctuation width amplifier may include a reference voltage source configured to generate the threshold voltage. The device may include an operational amplifier or a transistor coupling circuit configured to amplify a fluctuation width of a discharge voltage component of the battery. The discharge voltage component may have a voltage level higher than the threshold voltage from the reference voltage source.

The fluctuation width amplifier may include at least two reference voltage sources configured to generate threshold voltages having different voltage levels. The fluctuation width amplifier may include a selection unit configured to select a threshold voltage from at least one of the reference voltage sources based on a battery characteristic. In another general aspect, measuring residual charge in a battery includes inputting a discharge voltage of the battery to a measurement device. The discharge voltage of the battery is compared with a threshold voltage. The residual charge in the battery is set as "0" if the discharge voltage of the battery is less than the threshold voltage. A fluctuation width of the discharge voltage of the battery is amplified and the amplified discharge voltage is set as the residual charge in the battery if the discharge voltage of the battery is higher than the threshold voltage.

Implementations may include one or more of the following features. For example, a specific threshold voltage may be selected from at least two available threshold voltages having different voltage levels, wherein the threshold voltages are based on a characteristic of the battery and are selected before the discharge voltage of the battery is input to the measurement device.

In another general aspect, a portable electronic instrument for measuring residual charge in a battery includes a peripheral circuit module configured to be driven by a discharge voltage from the battery, a display element configured to display an operation state of the peripheral circuit module, a fluctuation width amplifier configured to amplify a fluctuation width of a discharge voltage from the battery in excess of a threshold voltage, and a controller configured to display the residual charge in the battery on the display element and to control an operation mode of the peripheral circuit module based on the discharge voltage having the amplified fluctuation width.

Implementations may include one or more of the following features. For example, the controller may include an analog to digital converter configured to convert the discharge voltage having the fluctuation width amplified by the fluctuation width amplifier into digital discharge voltage data. The controller may include a central processing unit configured to display the residual charge in the battery on the display element and to control an operation mode of the peripheral circuit module based on the digital discharge voltage data from the an analog-digital converter.

The fluctuation width amplifier may include a reference voltage source configured to generate the threshold voltage. The fluctuation width amplifier may include an operational amplifier or a transistor coupling circuit configured to amplify a fluctuation width of a discharge voltage component of the battery, wherein the discharge voltage component is higher than the threshold voltage from the reference voltage source.

The fluctuation width amplifier may include at least two reference voltage sources configured to generate threshold voltages having different voltage levels. The fluctuation width amplifier may include a selection unit configured to select a threshold voltage from at least two reference voltage sources based on a characteristic of the battery. The fluctuation width amplifier may include an operational amplifier or a transistor coupling circuit configured to amplify a fluctuation width of a discharge voltage component from the battery, wherein the discharge voltage component is higher than the threshold voltage from the selection unit.

In another general aspect, an apparatus for measuring residual charge in a battery includes a fluctuation width amplifier configured to amplify a fluctuation width of a discharge voltage from the battery in excess of a threshold voltage, and an operation module configured to calculate the residual charge in the battery based on the amplified discharge voltage.

Implementations may include one or more of the following features. For example, the operation module may include an analog to digital converter configured to convert the amplified discharge voltage into digital discharge voltage data, and a processor configured to calculate the amount of the residual charge in the battery based on the digital discharge voltage data from the analog-digital converter.

The processor may be configured to calculate the residual charge based on a conversion table, wherein the conversion table includes digital discharge voltage data in relation to a corresponding percentage of residual charge.

The apparatus may include a display element configured to display the percentage of residual charge.

In another general aspect, an apparatus for measuring an amount of residual charge in a battery includes a battery, a fluctuation width amplifier configured to amplify a fluctuation width of a discharge voltage from the battery in excess of a threshold voltage, an application management module configured to detect an application load amount based on an operating program operatively driven by the battery, and an operation module configured to calculate the residual charge in the battery based on the amplified discharge voltage amplified and the application load amount.

Implementations may include one or more of the following features. For example, the operation module may include an analog-digital converter configured to convert the amplified discharge voltage into digital discharge voltage data. The operation module may include a processor configured to calculate the residual charge based on the application load amount and the digital discharge voltage data from the analog-digital converter.

The processor may be configured to calculate the residual charge based on a conversion table, wherein the conversion table includes digital discharge voltage data and application load amount data in relation to a corresponding percentage of residual charge.

The apparatus may include a display element configured to display the percentage of residual charge.

In another general aspect, measuring an amount of residual charge in a battery includes amplifying a fluctuation width of a discharge voltage of a battery, removing a noise component from a discharge voltage having the amplified fluctuation width, calculating the residual charge in the battery based on a discharge voltage with the removed noise component, and correcting errors in the residual charge based on the discharge voltage.

Implementations may include one or more of the following features. For example, removing the noise component may include removing a transient response component included in the discharge voltage having the amplified fluctuation width. A high frequency noise component may be removed that is lower than the transient response component and which does not include a separate transient response component.

Correcting the errors may include comparing a current calculated amount of residual charge with a previously calculated amount of residual charge. Correcting the errors may include disregarding a currently calculated amount of residual charge that is greater than the previously calculated amount of residual charge.

Calculating the residual charge may include searching a conversion table for a percentage of residual charge corresponding to the discharge voltage.

In another general aspect, measuring residual charge in a battery based on a voltage includes amplifying a fluctuation width of a discharge voltage of a battery, calculating the residual charge in the battery based on a discharge voltage having the amplified fluctuation width, determining if an external power source is connected to a portable electronic instrument operatively connected with the battery, and correcting errors included in a calculation of the residual charge if the external power source is not connected to the portable electronic instrument.

Implementations may include one or more of the following features. For example, correcting errors may include comparing a current calculated amount of residual charge with a previously calculated amount of residual charge if the external power source is not connected to the portable electronic instrument, and disregarding the current calculated amount of residual charge greater than the previously calculated amount of residual charge.

The current calculated amount of residual charge may be displayed if the external power source is connected to the portable electronic instrument. A percentage of residual charge may be displayed if the external power source is not operatively connected to the portable electronic instrument.

Calculating the residual charge may include searching a conversion table for a percentage of residual charge corresponding to the discharge voltage.

In another general aspect, a portable electronic instrument for measuring a residual charge in a battery includes a peripheral circuit module operatively connected to the battery and driven by a discharge voltage from the battery, a fluctuation width amplifier configured to amplify a fluctuation width of the discharge voltage from the battery, and a controller. The controller is configured to calculate the residual charge in the battery based on a discharge voltage amplified by the fluctuation width amplifier, to correct errors included in a calculated amount of the residual charge, and to control an operation mode of the peripheral module based on the corrected amount of the residual charge.

Implementations may include one or more of the following features. For example, the controller may include an analog to digital converter configured to convert the discharge voltage having an amplified fluctuation width into digital discharge voltage data, and a processor. The processor may be configured to calculate the amount of the residual charge in the battery based on the digital discharge voltage data from the analog-digital converter, to correct errors included in the calculated amount of the residual charge, and to control an operation mode of the peripheral module based on the corrected amount of the residual charge.

The processor may be configured to calculate the amount of the residual charge in the battery by searching a conversion table, wherein the conversion table includes digital discharge voltage data in relation to a corresponding percentage of residual charge.

The processor may be configured to remove a noise component included in the digital discharge voltage data received from the analog-digital converter prior to calculating the amount of the residual charge.

In another general aspect, a portable electronic instrument for measuring an amount of residual charge in a battery includes a peripheral circuit module operatively driven by a discharge voltage from the battery and an external voltage from an external instrument, a fluctuation width amplifier configured to amplify a fluctuation width of the discharge voltage from the battery, and a controller. The controller is configured to calculate the amount of the residual charge in the battery based on a discharge voltage amplified by the fluctuation width amplifier, to correct errors included in the calculated amount of the residual charge if the peripheral circuit module is driven by the discharge voltage of the battery, and to control an operation mode of the peripheral circuit module based on the corrected amount of the residual charge.

Implementations may include one or more of the following features. For example, the processor may include an analog to digital converter configured to convert the discharge voltage having a fluctuation width amplified by the fluctuation width amplifier into digital discharge voltage data. The processor may include a central processing unit configured to calculate the amount of the residual charge in the battery based on the digital discharge voltage data from the analog to digital converter, to correct errors included in the calculated amount of the residual charge if the peripheral circuit module is driven by the discharge voltage of the battery, and to control an operation mode of the peripheral circuit module based on the corrected amount of the residual charge.

The central processing unit may be configured to calculate the amount of the residual charge in the battery by searching a conversion table, wherein the conversion table includes digital discharge voltage data in relation to a corresponding percentage of residual charge.

The central processing unit may be configured to remove a noise component included in the digital discharge voltage data from the analog to digital converter before the amount of the residual charge is calculated by the central processing unit.

The controller may be configured to display the calculated amount of the residual charge as the amount of the residual charge in the battery if the peripheral circuit module is driven by the external voltage.

In another general aspect, a portable electronic instrument for measuring an amount of residual charge in a battery includes a peripheral circuit module operatively driven by a discharge voltage from the battery, a fluctuation width amplifier configured to amplify a fluctuation width of the discharge voltage from the battery, an application management module configured to detect an application load amount due to an operative application in the portable electronic instrument, and a controller. The controller is configured to calculate the amount of residual charge in the battery based on the amplified discharge voltage and the application load amount, to correct errors included in the calculated amount of the residual charge, and to control an operation mode of the peripheral module based on the corrected amount of the residual charge.

Implementations may include one or more of the following features. For example, the controller may include an analog to digital converter configured to convert the discharge voltage having a fluctuation width amplified by the fluctuation width amplifier into digital discharge voltage data. The controller may include a central processing unit configured to calculate the amount of the residual charge in the battery based on the digital discharge voltage data from the analog-digital converter and the application load amount, to correct errors included in the calculated amount of the residual charge if the peripheral circuit module is driven by the discharge voltage of the battery, and to control an operation mode of the peripheral module based on the corrected amount of the residual charge.

The central processing unit may be configured to calculate the amount of the residual charge in the battery by searching a conversion table, wherein the conversion table includes digital discharge voltage data and application load amount data in relation to a corresponding percentage of residual charge.

The central processing unit may be configured to remove a noise component included in the digital discharge voltage data from the analog-digital converter before calculating the amount of the residual charge.

In another general aspect, a portable electronic instrument for measuring an amount of residual charge in a battery includes a peripheral circuit module operatively driven by a discharge voltage from the battery and an external voltage from an external instrument, a fluctuation width amplifier configured to amplify a fluctuation width of the discharge voltage from the battery, an application management module configured to detect an application load amount due to an operative application in the portable electronic instrument, and a controller. The controller is configured to calculate the amount of the residual charge in the battery based on the amplified discharge voltage and the application load amount, to correct errors included in the calculated amount of the residual charge if the peripheral circuit module is driven by the discharge voltage of the battery, and to control an operation mode of the peripheral module based on the corrected amount of the residual charge.

The controller may include an analog to digital converter configured to convert the discharge voltage having a fluctuation width amplified by the fluctuation width amplifier into digital discharge voltage data. The controller may include a central processing unit configured to calculate the amount of the residual charge in the battery based on the digital discharge voltage data from the analog to digital converter and the application load amount, to correct errors included in the calculated amount of the residual charge if the peripheral circuit module is driven by the discharge voltage of the battery, and to control an operation mode of the peripheral module based on the corrected amount of the residual charge.

The central processing unit may be configured to calculate the amount of the residual charge in the battery by searching a conversion table, the conversion table including digital discharge voltage data and application load amount data in relation to a corresponding percentage of residual charge.

The central processing unit may be configured to remove noises included in the digital discharge voltage data from the analog to digital converter before calculating the amount of the residual charge.

The controller may be configured to display the calculated amount of the residual charge as the amount of the residual charge in the battery if the peripheral circuit module is driven by the external voltage.

Other features will be apparent from the following description, including the drawings, and the claims.

BRIEF DESCRIPTION OF THE DRAWINGS

FIG. 5 is a view of a conversion table used for calculating an amount of charge in a battery based on discharge voltage of the battery.

DETAILED DESCRIPTION

Figure 1:
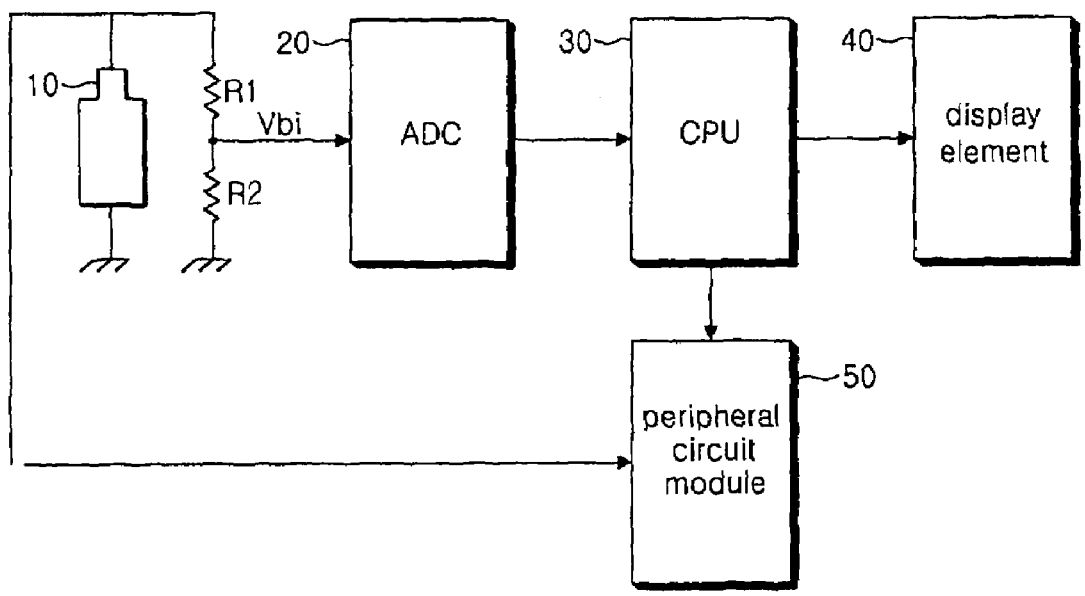
FIG. 1 is a block diagram of a portable electronic instrument for measuring an amount of residual charge in a battery based on voltage.

In the following description and drawings, the same reference numerals are used to designate the same or similar components, and so repetition of the description on the same or similar components will be omitted.

Referring to FIG. 1, a portable electronic instrument includes a voltage divider R1 and R2 serially connected to a battery pack 10, an analog-digital converter (ADC) 20, a central processing unit (CPU) 30, a display unit 40, and a peripheral circuit module 50.

Figure 2:
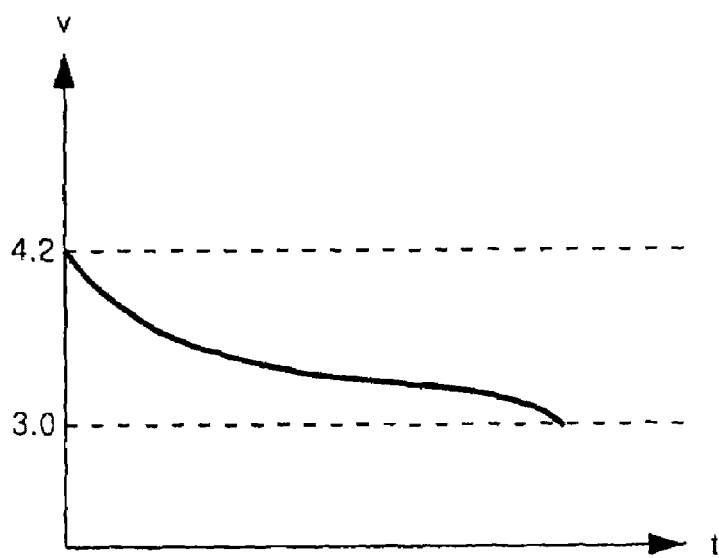
FIG. 2 is a graph of a discharge voltage characteristic of a battery pack showing voltage fluctuation while the battery pack is discharged over time.

The portable electronic instrument displays a discharge voltage of a battery divided by a simple divider R1 and R2 on the display unit 40 through the ADC 20 AND the CPU 30 as an amount of charge in the battery 10. The discharge voltage of the battery 10 is finely lowered within the range of 4.2V to 3.0V as shown in FIG. 2. Although the discharge voltage of the battery is lowered more significantly at the beginning and end stages of a voltage discharge period, the discharge voltage is lowered relatively slowly during most of the interim voltage discharge period.

Accordingly, it is difficult to determine the fluctuation of the discharge voltage during the discharge process in many conventional apparatus used for measuring an amount of charge in a battery based on voltage. Further, it is difficult to display the exact amount of charge in a battery. In a device for measuring an amount of charge in a battery of a lithium-ion battery or a lithium-ion polymer battery, in which the level of the discharge voltage thereof is changed within the range of 3.7V to 3.8V, there may be even more difficulties in determining the fluctuation of the discharge voltage.

In addition, the CPU 30 may erroneously determine an operational mode of the peripheral circuit module 50 due to errors included in discharge voltage data from the ADC 20. For example, when there is a sufficient amount of charge in the battery 10, the CPU 30 may erroneously specify the operational mode of the peripheral circuit module 50 as a sleep mode or a deep sleep mode. In this case, the CPU 30 may unnecessarily restrict use of the portable electronic instrument, or cause a data loss due to the failure of detection during a last stage of a voltage discharge period of the battery 10.

The use of the portable electronic instrument may be unnecessarily restricted due to errors in the discharge voltage data even though an amount of charge in the battery is sufficient. In addition, important information of the user may be lost upon the failure of detection for the last stage of a voltage discharge period of the battery.

Figure 3:
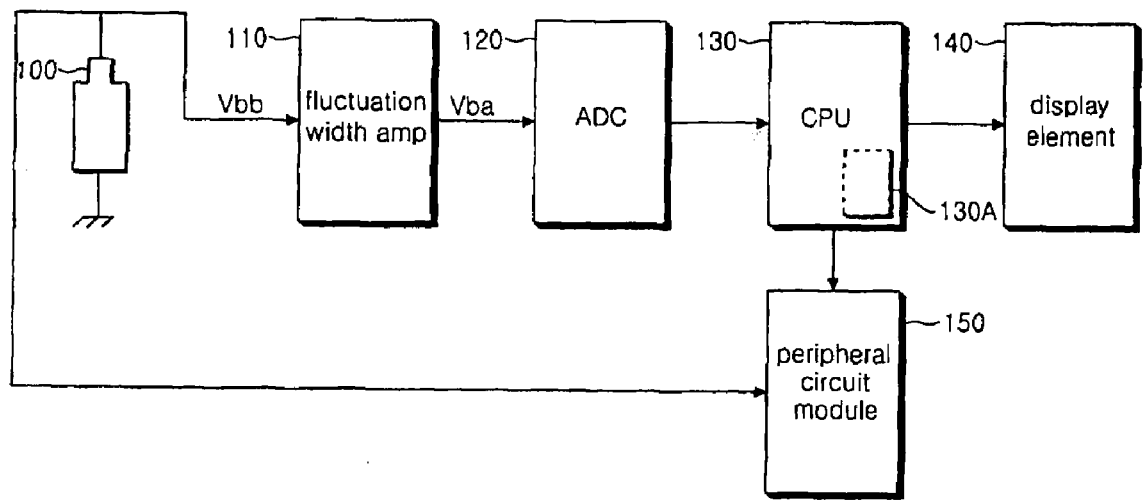
FIG. 3 is a block diagram of a portable electronic instrument for measuring an amount of residual charge in a battery based on voltage.

Referring to FIG. 3, a portable electronic instrument capable of measuring an amount of charge in a battery includes an amplifier 110 for amplifying voltage fluctuation width. The amplifier 110 is (hereinafter, referred to as "fluctuation width amplifier") serially connected to a battery pack 100, an analog-digital converter 120, a central processing unit 130, and a display element 140. Although the battery pack 100 includes at least one battery cell for purposes of the following description, the battery pack 100 may include one or more battery cells.

Figure 4:
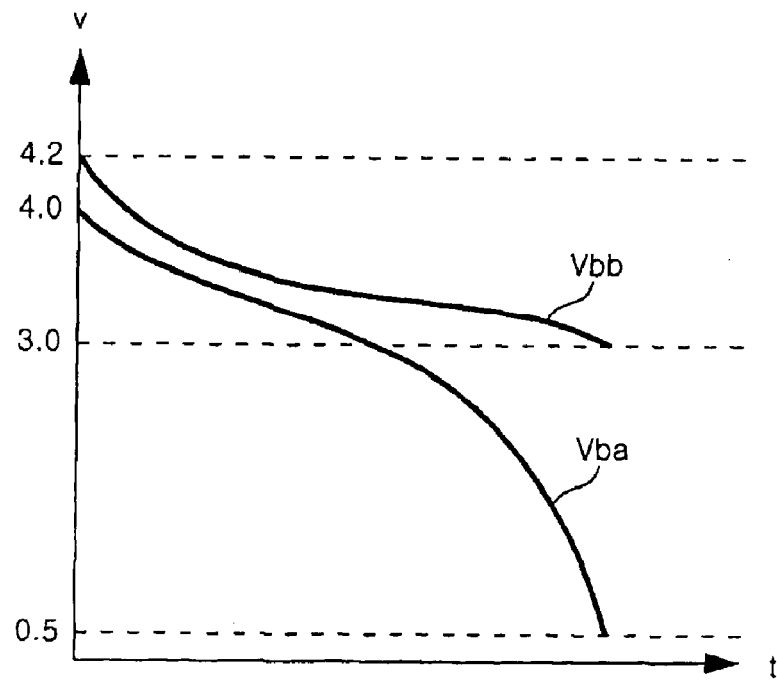
FIG. 4 is a graph of a voltage characteristic depicting a fluctuation characteristic of a discharge voltage from a battery pack and a fluctuation characteristic of an output signal of a fluctuation width amplifier.

Although voltage discharged from the battery pack 100 is maintained at approximately 4.2V when the battery pack 100 is fully charged, the voltage becomes a level of 3.0V when the battery pack 100 is completely discharged as shown through a primary characteristic curve Vbb of FIG. 4. In addition, the voltage of the battery pack 100 finely changes within a range of 4.2V to 3.0V in most of voltage discharge periods.

The fluctuation width amplifier 110 amplifies the discharge voltage Vbb of the battery pack 100 having a voltage level exceeding a preset threshold value, thereby amplifying the fluctuation width of the discharge voltage Vbb of the battery pack 100. Specifically, the fluctuation width amplifier 110 amplifies the discharge voltage Vbb of the battery pack 100 in excess of the threshold voltage so as to increase the slope of the characteristic curve for the discharge voltage Vbb.

The threshold voltage is set in such a manner that only the voltage part exceeding the discharge voltage, e.g., 3.0V in the first characteristic curve Vbb shown in FIG. 4, of the battery pack 100 at a last stage of a voltage discharge period can be amplified. A discharge voltage (Vba) amplified by this fluctuation width amplifier 110 rapidly changes within the range of 0.5V to 4.0V as shown in a second characteristic curve Vba shown in FIG. 4. Accordingly, a fluctuation width of 1.2V, i.e., a gradual slope, of the discharge voltage Vbb, which is discharged in the battery pack 100, is amplified by the fluctuation width amplifier 110 to a fluctuation width of 3.5V, i.e., a steep slope, which is approximately three times that of the 1.2 V. An amplification ratio for the fluctuation width of this discharge voltage may be set as a small value or a large value by a manufacturer according to the range of voltage which can be converted by the ADC 120 connected to the output of the fluctuation width amplifier 110.

The ADC 120 converts discharge voltage Vbb amplified by the fluctuation width amplifier 110 into digital data. Digital discharge voltage data converted by the ADC 120 is supplied to the CPU 130. The CPU 130 supplies the digital discharge data from the ADC 120 to the display element 140 so as to allow the display element 140 to display the digital discharge data as an indication of residual charge.

The CPU 130 determines whether the residual charge exists in the battery pack 100 based on the digital discharge voltage data. According to the determination result, the operation mode of a peripheral circuit module 150 is switched from an active mode to a waiting mode, from the waiting mode to a sleep mode, or from the sleep mode to a deep sleep mode. Accordingly, it is possible to prevent unnecessary restrictions on the use of a portable electronic instrument. Although the CPU 130 is used for controlling several circuits embedded in the portable electronic instrument, including the peripheral circuit module 150 and the display element, the CPU 130 drives the display element in relation to a device for measuring charge in a battery based on voltage. Thus, the CPU 130 performs a function of driving the display element that may be included in a display module of a measurement device for measuring an amount of charge in a battery based on a voltage with the ADC 120 and the display module 140.

In addition, the CPU 130 calculates an amount of charge (e.g., a percentage of charge) in the battery pack 100 from a conversion table shown in FIG. 5 and based on digital discharge voltage data from the ADC 120. Thus, an amount of charge in the battery pack 100 calculated by the CPU 130 is supplied to the display element 140 so as to be reported to a user. At the same time, the CPU 130 switches the operation mode of the peripheral circuit module 150 to an idle mode or a sleep mode from an active mode, or to a deep sleep mode from the sleep mode according to the percentage of charge in the battery pack 100.

According to the conversion table shown in FIG. 5, a discharge voltage of the battery pack 100 has a level of approximately 4.2V when the battery pack 100 is completely charged, and a discharge voltage of the battery pack 100 has a level of approximately 3.0V when the battery pack 100 is discharged. An exemplary discharge period, e.g., from a fully charged state to a completely discharged state, is divided into eight intervals according to discharge voltage, digital discharge voltage data and percentage of charge. A discharge voltage of the battery pack 100 at an end time point of each small interval is set in percentage correspondingly to an amount of charge in the battery pack.

For example, referring to FIG. 5, if digital discharge voltage data has a level of above 2.5V, the CPU 130 determines that the amount of charge in the battery pack 100 is more than 85%. If digital discharge voltage data has a level within the rage 2.5V to 1.90V, the CPU 130 determines the percentage of charge in the battery pack 100 to be within the range of 85% to 70%. If digital discharge voltage data has a level within the range of 1.90V to 1.60V, the CPU 130 determines the percentage of charge in the battery pack 100 to be within the range of 70% to 60%. If digital discharge voltage data has a level within the range of 1.60V to 1.45V, the CPU 130 determines the percentage of charge in the battery pack 100 to be within the range of 60% to 50%. If digital discharge voltage data has a level within the range of 1.45V to 1.30V, the CPU 130 determines the percentage of charge in the battery pack 100 to be within the range of 50% to 40%. If digital discharge voltage data has a level within the range of 1.30V to 1.15V, the CPU 130 determines the percentage of charge in the battery pack 100 to be within the range of 40% to 30%. If digital discharge voltage data has a level within the range of 1.15V to 1.00V, the CPU 130 determines the percentage of charge in the battery pack 100 to be within the range of 30% to 20%. If the digital discharge voltage data has a level of 1.00V or less, the CPU 130 determines the percentage of charge in the battery pack 100 to be approximately 20% or less.

Moreover, digital discharge voltage data of 4.00V, 2.50V, 1.90V, 1.60V, 1.45V, 1.30V, 1.15V, 1.00V, and 0.50V are obtained through amplification of the fluctuation width amplifier 120 and then analog-to-digital conversion for discharge voltages of 4.20V, 3.70V, 3.50V, 3.40V, 3.35V, 3.30V, 3.25V, 3.20V, and 3.00V, respectively. The digital discharge voltage data of 4.00V, 2.50V, 1.90V, 1.60V, 1.45V, 1.30V, 1.15V, 1.00V, and 0.50V correspond to the discharge voltages of 4.20V, 3.70V, 3.50V, 3.40V, 3.35V, 3.30V, 3.25V, 3.20V, and 3.00V in the battery pack 100, respectively.

Thus, it is possible to more precisely determine an amount of charge in the battery pack 100 through a measurement scheme based on the digital discharge voltage data as compared with a scheme for displaying the digital discharge voltage data as the amount of charge. Although the CPU 130 is used for controlling all circuits embedded in the portable electronic instrument, including the peripheral circuit 150 and the display element 140, the CPU 130 acts as a driving unit for a unit for measuring an amount of charge in a battery based on voltage and for a display element. In addition, the conversion table for charge in a battery shown in FIG. 5 is provided based on experimental value(s) that may be obtained for each battery pack.

In another measurement technique, the CPU 130 can measure an amount of charge in the battery pack 100 based on an amount of load caused by an application managed by the CPU 130 (hereinafter, referred to as "application load amount") and digital discharge voltage data from the ADC 120. Specifically, the CPU 130 calculates a percentage of charge in the battery pack 100 through a conversion table shown in FIG. 6. The conversion table of FIG. 6 includes the relationship between discharge voltage of the battery pack 100 and the application load amount of the CPU 130.

Figures 6, 7:
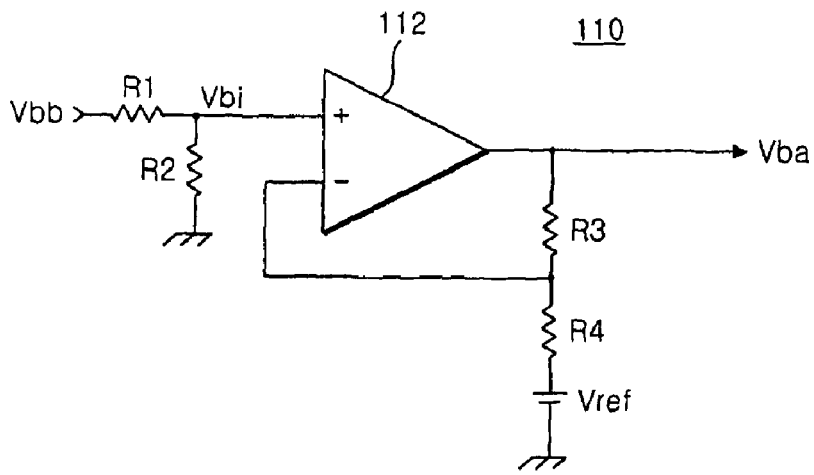
FIG. 6 is a view of a conversion table used for calculating an amount of charge in a battery based on discharge voltage of the battery and an amount of a load due to an application.
FIG. 7 is a circuit diagram of a fluctuation width amplifier.

Through the conversion table shown in FIG. 6, if the application load amount corresponds to 50% or less, the CPU 130 measures an amount of charge in the battery pack 100 according to the digital discharge voltage data as shown in FIG. 5 (and the first column in FIG. 6 labeled 50% less). In contrast, if the application load amount exceeds 50%, the CPU 130 determines digital discharge voltage data exceeding 1.90V as indicative of the percentage of charge of the battery pack 100 exceeding 85%, digital discharge voltage data within the range of 1.90V to 1.45V as indicative of the percentage of charge of the battery pack 100 within the range of 85% to 70%, digital discharge voltage data within the range of 1.45V and 1.30V as indicative of the percentage of charge of the battery pack 100 within the range of 70% to 60%, digital discharge voltage data within the range of 1.30V to 1.15V as indicative of the percentage of charge of the battery pack 100 within the range of 60% to 50%, digital discharge voltage data within the range of 1.15V to 1.00V as indicative of the percentage of charge of the battery pack 100 within the range of 50% to 40%, and digital discharge voltage data having a value of 1.00V or less as indicative of percentage of charge of the battery pack 100 within the range of 40% to 30%.

The amount of charge in the battery pack 100 may be measured by searching for digital discharge data having a middle level value and an application load amount in the conversion table for an amount of charge in a battery used by row and column addresses. The conversion table for an amount of charge in a battery is generated based on experimental values obtained for the specific battery pack.

Referring to FIG. 3, in order to detect the application load amount, the CPU 130 includes an application managing module 130A. The application managing module 130A is realized through an operational system program and a basic input and output system (BIOS) managed in the CPU 130.

Thus, it is possible to more precisely determine an amount of charge in the battery pack 100 through a measurement technique based on discharge voltage and on application load amount. Although the CPU 130 is used for controlling all circuits embedded in the portable electronic instrument, including the peripheral circuit 150 and the display element 140, the CPU 130 acts as a driving unit for driving a measurement device.

Referring to FIG. 7, one or more fluctuation width amplifiers 110 may be used in the device of FIG. 3. The fluctuation width amplifier 110 shown in FIG. 7 includes an operational amplifier 112 for inputting the discharge voltage of the battery pack 100 to a non-inverted input port (+) through the first resistor R1 and the second resistor R2 connected between the non-inverted input port (+) and the line of the grounding voltage GND. Furthermore, the fluctuation width amplifier 110 includes a third resistor R3 provided on a feedback loop between an output port of the operational amplifier 112 and the inverted input port (−), a fourth resistor R4 serially connected between the inverted input port (−) of the operational amplifier 112 and the line of the grounding voltage GND, and a reference voltage Vref.

The operational amplifier 112 determines whether the discharge voltage Vbb of the battery pack 100 input through the first resistor R1 is higher than a threshold voltage from the reference voltage Vref input through the fourth resistor R4. If the discharge voltage Vbb of the battery pack 100 is lower than the threshold voltage, the operational amplifier 112 generates an output voltage of 0.5V or less on the output port. In contrast, if the discharge voltage Vbb of the battery pack 100 is higher than the threshold voltage Vref, the operational amplifier 112 amplifies a fluctuation width of 1.2V of the discharge voltage of the battery pack 100 to a fluctuation width of 3.5V by amplifying a discharge voltage Vbi obtained through division using the first resistor and the second resistor R1 and R2 in a predetermined amplification ratio.

The amplifying ratio Ao of the operational amplifier 112, e.g., the ratio of the voltage Vba on the output port of the operational amplifier to the divided discharge voltage Vbi, is obtained through Equation 1.

$$A_o = Vbb/Vbi = 1 + \{\mu R4/(R3+R4)\} \quad \text{Equation 1}$$

The threshold voltage Vref is set as 3.0V at a last stage of a voltage discharge period of the battery pack 100 so that it may be indicated that there is no residual charge in the battery pack 100 at the last stage.

Figure 8:
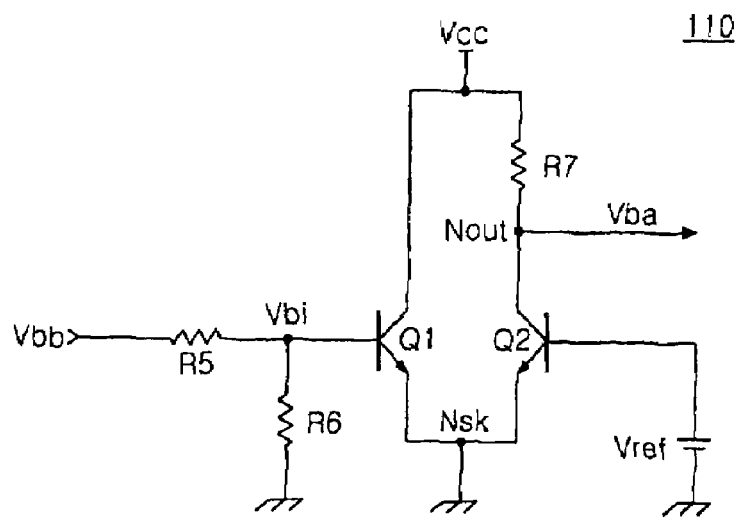
FIG. 8 is a circuit diagram of an alternative fluctuation width amplifier.

Referring to FIG. 8, an alternative fluctuation width amplifier 110 may be used in the device of FIG. 3. The fluctuation width amplifier 110 shown in FIG. 8 includes a voltage divider R5 and R6 for dividing the discharge voltage Vbb from the battery pack 100. The fluctuation width amplifier 110 includes a first transistor Q1 responding to the discharge voltage Vbi obtained through division using the voltage divider R5 and R6. The first transistor Q1 has a collector connected to the line of a supply voltage Vcc and an emitter connected to the line of a sync node Nsk. In addition, the fluctuation width amplifier 110 includes a second transistor Q2 responding to the threshold voltage from the reference voltage source Vref and a resistor R7 connected between the second transistor Q2 and the collector. The second transistor Q2 has an emitter connected to the line of the sync node Nsk. The sync node Nsk is connected to the line of the grounding voltage GND. A connection point between the resistor R7 and the collector of the second transistor is used as an output node Nout.

The voltage divider R5 and R6 divides the discharge voltage Vbb from the battery pack 100 according to the ratio between values of resistors R5 and R6. The discharge voltage Vbi obtained by the voltage divider R5 and R6 may have a voltage level corresponding to a half or one third of the level of the discharge voltage Vbb in the battery pack. In certain implementations, the ratio of the voltage divider R5 and R6 is set in such a manner that discharge of the battery pack 100 can be minimized. For the purpose of description, it is assumed that a division ratio of the voltage divider R5 and R6 is set as "1:2." That is, the resistor R5 has the same value as the resistor R6. In this case, the discharge voltage Vbi obtained through division using the voltage divider R5 and R6 has a level within the range of 1.5V to 2.1V. The level of the threshold value Vref is set as the same level as a voltage level obtained by dividing the discharge voltage, i.e., 3.0V in the primary characteristic curve shown in FIG. 4, of the battery pack 100 at the last stage of the voltage discharge period in the division ratio, i.e., 1:2, of the voltage divider R5 and R6. This permits the discharge voltage from the battery pack 100 to be indicated as no charge at the last stage of the voltage discharge period. Accordingly, the threshold voltage Vref is set as 1.5V.

The first transistor Q1 and the second transistor Q2 amplify the fluctuation width of the divided discharge voltage Vbi having a value exceeding the threshold voltage Vref in a predetermined ratio. For instance, the first transistor Q1 and the second transistors Q2 amplify the fluctuation width (1.2V) of the discharge voltage (3.0V to 4.2V) of the battery pack 100 to a fluctuation width (3.5V) of the discharge voltage (0.5V to 4.0V) of the battery pack 100 as shown in the second characteristic curve Vba in FIG. 4.

If the divided discharge voltage Vbi obtained through the voltage divider R5 and R6 is higher than the threshold voltage Vref based on the reference voltage source, the first transistor Q1 increases an amount of current flowing between the collector and the emitter so as to increase impedance of the second transistor Q2, so that an amplified voltage can appear on the output node Nout. In contrast, if the discharge voltage Vbi obtained through the voltage divider R5 and R6 is smaller than the threshold voltage Vref based on the reference voltage source, the second transistor Q2 increases an amount of current flowing between the collector and the emitter, so that a voltage of 0.5V or less appears on the output node Nout. Through the comparison and amplification operation of the first transistor Q1 and the second transistor Q2, the amplified discharge voltage Vba on the output node Nout rapidly changes within the range of 4.0V to 0.5V as shown through the second characteristic curve Vba of FIG. 4.

The fluctuation width 1.2V, i.e., gradual slope, for the discharge voltage from the battery pack 100 is amplified to the fluctuation width 3.5V, i.e., steep slope, corresponding to three times 1.2V by the first transistor Q1 and the second transistor Q2. This amplification rate of the discharge voltage is determined by adjusting the value of the resistor R7, which is connected between the line of the supply voltage Vcc and the line of the output node Nout, according to a voltage width. The discharge voltage can be converted by the ADC 120 positioned at an output of the variable fluctuation width amplifier.

Figure 9:
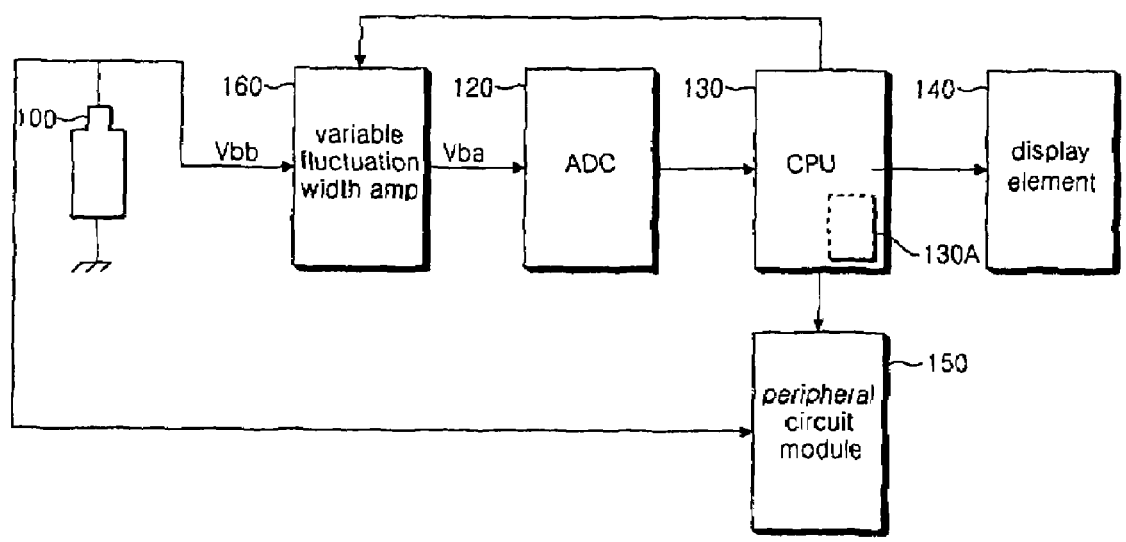
FIG. 9 is a schematic block diagram of a portable electronic instrument capable of measuring an amount of charge in a battery based on voltage.

Referring to FIG. 9, the portable electronic device is similar to the device of FIG. 3. However, the fluctuation width amplifier 110 of FIG. 3 is replaced with a variable fluctuation width amplifier 160 under the control of the CPU 130. The components shown in FIG. 9 that are identical to those shown in FIG. 3 will be described with the same reference numerals and the same names as those shown in FIG. 3.

Referring to FIG. 9, the variable fluctuation width amplifier 160 selects one or more of two threshold voltages having different voltage levels in response to the control of the CPU 130. The variable fluctuation width amplifier 160 amplifies a component of the discharge voltage Vbb from the battery pack 100 having a level higher than that of the selected threshold voltage in the predetermined amplification ratio so as to amplify the fluctuation width (slope) of the discharge voltage of the battery pack 100. The selection of the threshold voltage is determined according to the type of the battery pack 100. For example, if the battery pack 100 is a typical battery, the threshold voltage is set as 3.0V. In contrast, if the battery pack 100 is a lithium-ion battery or a lithium-ion polymer battery changing within the range of 3.7V to 3.8V, the threshold voltage is set as 3.7V. The CPU 130 modifies the threshold voltage of the variable fluctuation width amplifier 160 in response to the type of a battery specified by the manufacturer through the key input module included in the peripheral circuit module 150.

Alternatively, the variable fluctuation width amplifier 160 may include a threshold voltage selecting element, which can be manipulated by the manufacturer, instead of being controlled by the CPU 130. In this case, the manufacturer can specify the threshold voltage of the variable fluctuation width amplifier 160 by manipulating the threshold voltage selecting element. Thus, the variable fluctuation width amplifier 160 amplifies the fluctuation width of a discharge voltage component of the battery pack 100 having a level higher than that of the specified threshold voltage.

The device for measuring an amount of charge in a battery based on a voltage including this variable fluctuation width amplifier 160 can precisely measure amounts of residual charge in all batteries regardless of the type of battery.

Figure 10:
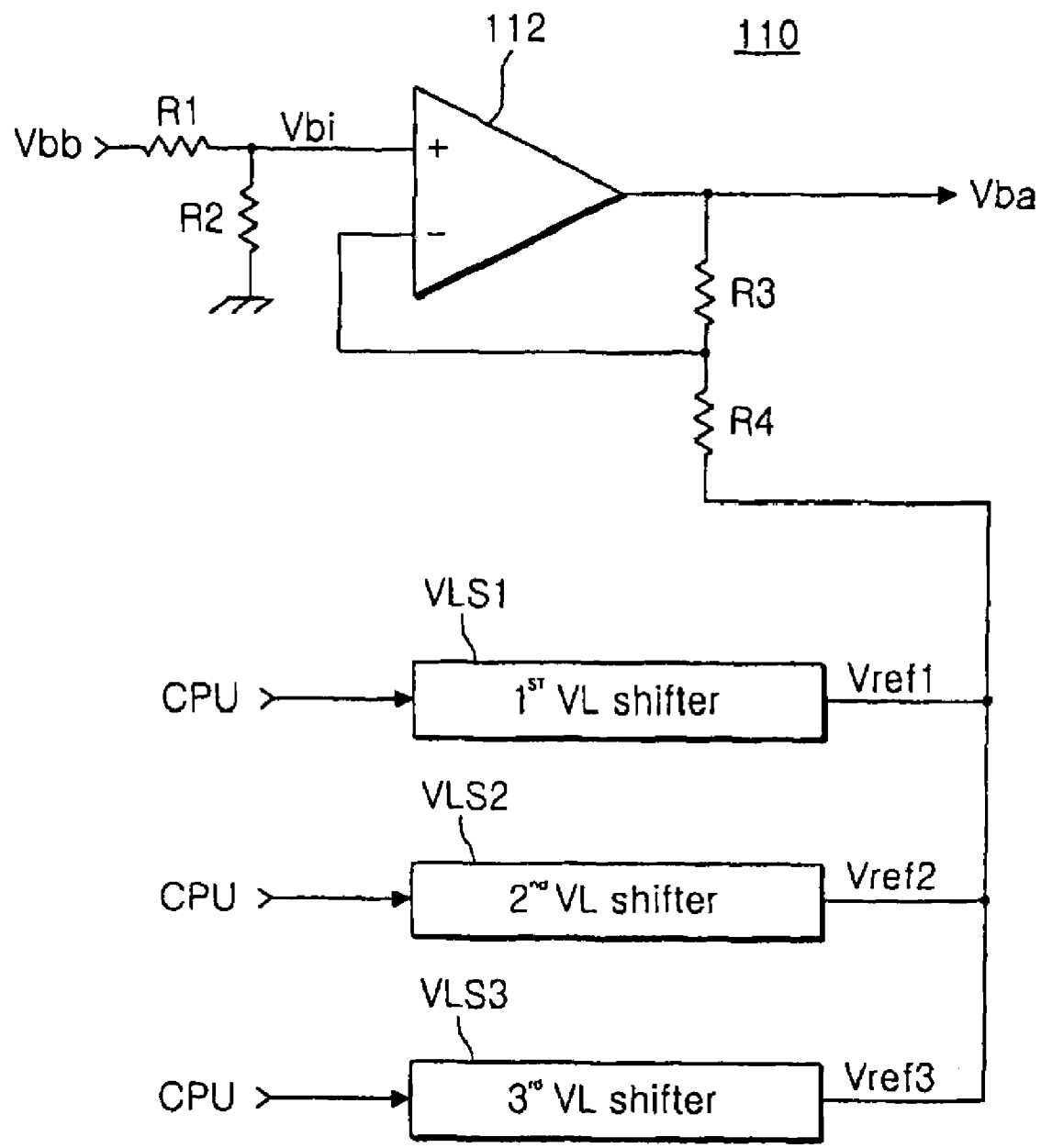
FIG. 10 is a circuit diagram of a variable fluctuation width amplifier.

Referring to FIG. 10, a variable fluctuation width amplifier 160 has the same structure as that shown in FIG. 7 except that the first level shifter VLS1 to the third level shifter VLS3 are connected to the inverted input port (−) of the operational amplifier through a resistor R4, and instead of the reference voltage source Vref. Accordingly, the components shown in FIG. 10 performing the same function as those shown in FIG. 7 will be described with the same names and reference numerals as those shown in FIG. 7.

The first level shifter VLS1 to the third level shifter VLS3 shift the supply voltage Vcc into voltages having different, lower voltage levels, so as to allow the level-shifted voltages to be input to the inverted input port (−) of the operational amplifier 112 through the resistor R4 as threshold voltages. For example, the first level shifter VLS1 generates the first threshold voltage Vref1 of 3.0V, which is a voltage level at the last stage of the voltage discharge period in the typical battery. The second level shifter VLS2 generates the second threshold voltage Vref2 of 3.8V, which is a voltage level at the last stage of the voltage discharge in a lithium-ion battery or a lithium-ion polymer battery. A third level shifter VLS3 generates the third threshold voltage Vref3 of 1.75V, which is a voltage level at the last stage of the voltage discharge in a cadmium battery. In addition, the first level shifter VLS1 to the third level shifter VLS3 exclusively operate under the control of the CPU 130 shown in FIG. 7. Specifically, only one of the first level shifter VLS1 through the third level shifter VLS3 is driven by a control signal of the CPU 130. Although three exemplary level shifters VLS1-VLS3 are shown, the number of the level shifters may be varied. For example, the number of level shifters may be varied according to the number of battery cells or types of batteries.

The operational amplifier 112 amplifies the fluctuation width of the discharge voltage Vbb in the battery pack 100 by amplifying a component of the discharge voltage Vbb in the battery pack 100 having a level higher than that of a threshold voltage corresponding to one of the first level shifter VLS1 to the third level shifter VLS3. The effects of the detailed operation of this operational amplifier 112 will be omitted because the effects are described in detail with reference to FIG. 7. Thus, the operational amplifier 112 responds to the threshold values Vref1 through Vref3 which correspond to the level shifters VLS1 through VLS3, respectively, so that it is possible to more precisely measure an amount of charge in a battery based on voltage as shown in FIG. 7 and regardless of the type of battery being measured.

Alternatively, one of the first level shifter VLS1 to the third level shifter VLS3 may be selected by a selection switch. The selection switch may be connected between the resistor R4 and the first level shifter VLS1 to the third level shifter VLS3 and can be manipulated by the manufacturer, for example, instead of being controlled exclusively by the CPU 130. The manufacturer may manipulate the selection switch according to the type of a battery, which is a target for the measurement of an amount of charge, so that one of the first level shifter VLS1 to the third level shifter VLS3 can be connected to the resistor R4.

Figure 11:
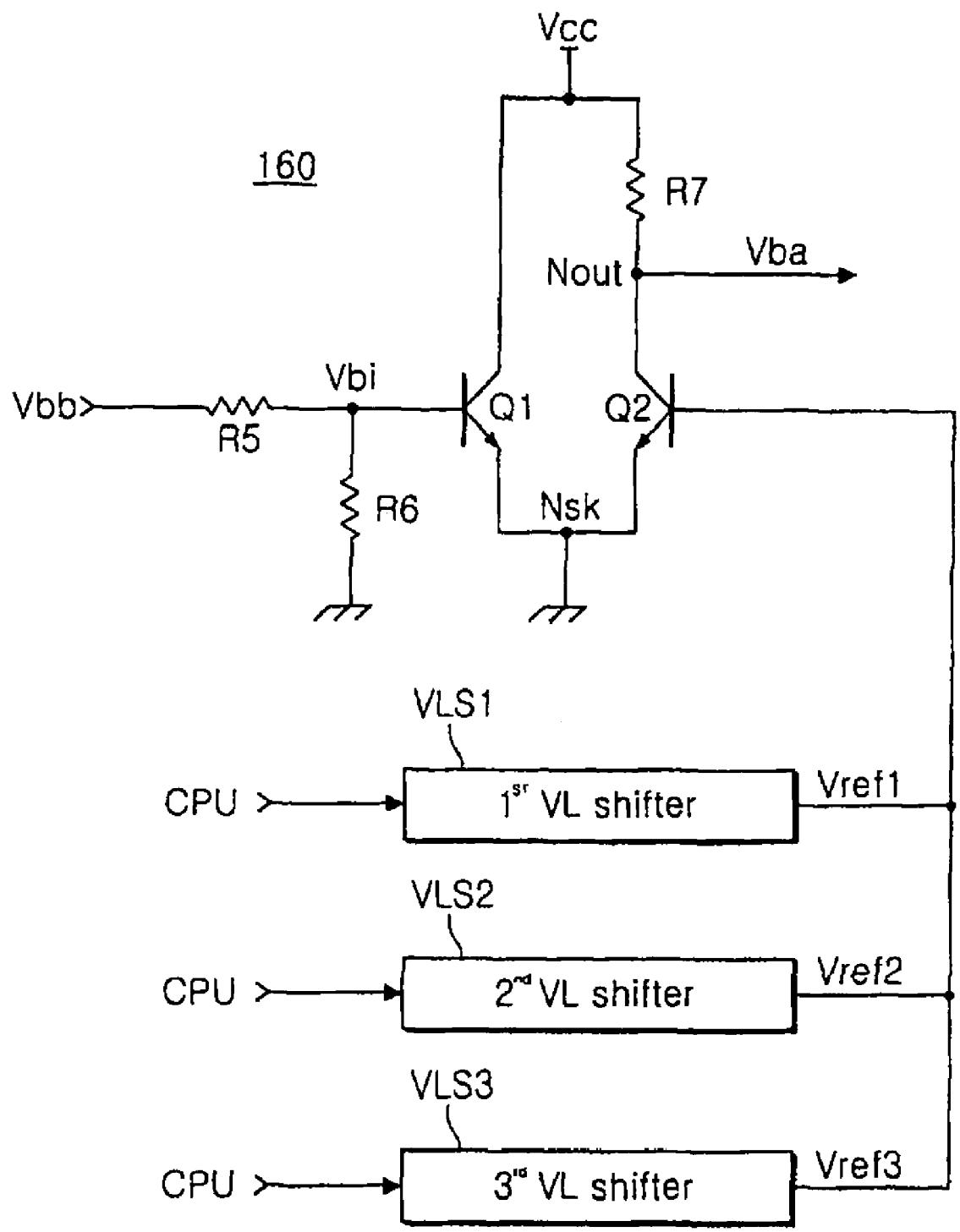
FIG. 11 is a circuit diagram of an alternative variable fluctuation width amplifier.

Referring to FIG. 11, an alternative variable fluctuation width amplifier 160 has the same structure as that shown in FIG. 8 except that the variable fluctuation width amplifier 160 has a base of the second transistor Q2 connected to the first level shifter VLS1 to the third level shifter VLS3 and instead of the reference voltage source Vref. Accordingly, components shown in FIG. 11 having the same function as that shown in FIG. 8 will be described with the same numeral numbers and name as those shown in FIG. 8.

Referring to FIG. 11, the first level shifter VLS1 through the third level shifter VLS3 shift the supply voltage Vcc into voltages having different, lower voltage levels to allow the level-shifted voltages (threshold voltages) to be supplied to a base of the second transistor Q2. For example, the first level shifter VLS1 generates the first threshold voltage Vref1 of 1.5V obtained by dividing a voltage level of 3.0V at the last stage of the voltage discharge period of the typical battery in the ratio of ½ of the divider R5 and R6. The second level shifter VLS2 generates the second threshold voltage Vref21 of 1.9V obtained by dividing a voltage level of 3.8V at a last stage of a voltage discharge period of a lithium-ion battery or a lithium-ion polymer battery in the ratio of ½ of the divider R5 and R6. A third level shifter VLS3 generates a third threshold voltage Vref3 of 0.875V obtained by dividing a voltage level of 1.75V level at a last stage of a voltage discharge period of a cadmium battery in the ratio of ½ of the divider R5 and R6. In addition, the first level shifter VLS1 through the third level shifter VLS3 exclusively operate under the control of the CPU 130 shown in FIG. 9. Specifically, only one of the first level shifter VLS1 through the third level shifter VLS3 is driven by a control signal of the CPU 130.

The first transistor Q1 and the second transistor Q2 amplify the fluctuation width of the discharge voltage Vbb in the battery pack 100 by amplifying the fluctuation width of a component of the divided discharge voltage Vbi having a level higher than that of a threshold voltage corresponding to one of the first level shifter VLS1 through the third level shifter VLS3. The effects of the detailed operations of the first transistor Q1 and the second transistor Q3 will be omitted because the effects are described in detail with reference to FIG. 8. Since the first transistor Q1 and the second transistor Q3 respond to the threshold voltages Vref1 through Vref3, which correspond to the level shifters VLS1 through VLS3, respectively, it is possible to precisely measure an amount of charge in a battery based on voltage and regardless of the type of battery.

Alternatively, one of the first level shifter VLS1 through the third level shifter VLS3 may be selected by a selection switch. The selection switch is connected between a base of the second transistor Q2 and the first level shifter VLS1 to the third level shifter VLS3. The selection switch can be manipulated by the manufacturer, instead of being controlled by the CPU 130. The manufacturer manipulates the selection switch according to the type of a battery, so that one of the first level shifter VLS1 to the third level shifter VLS3 can be connected to the base of the second transistor Q2.

Figure 12:
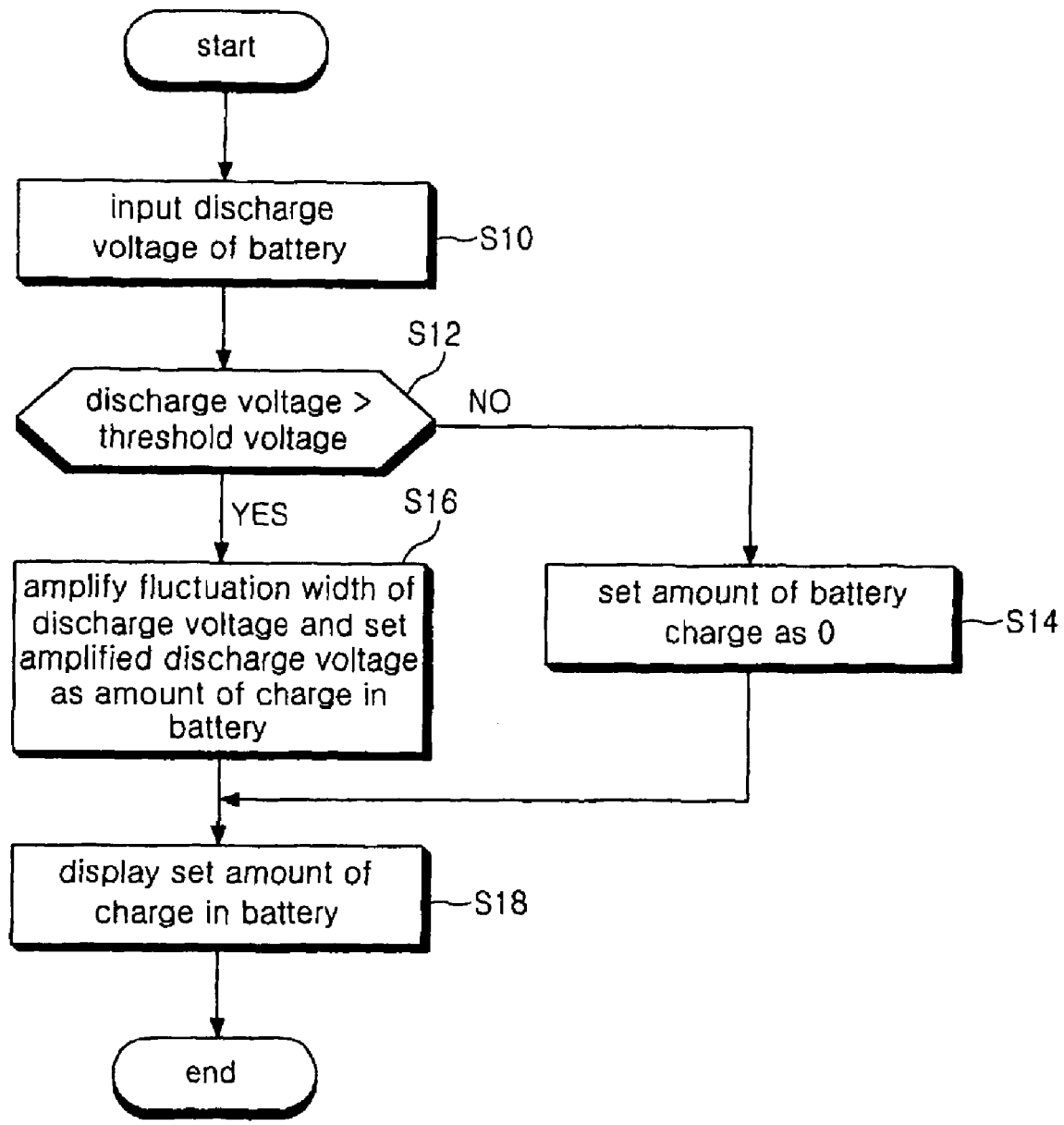
FIG. 12 is a flowchart of a process for measuring charge in a battery based on voltage.

Referring to FIG. 12, the CPU 130 shown in FIG. 3 and/or FIG. 9 can perform a process within a predetermined period of time. Initially, a discharge voltage Vbb from the battery pack 100 is input to the fluctuation width amplifier 160 (S10). The fluctuation width amplifier 160 then determines whether the input discharge voltage Vbb of the battery pack 100 is higher than the threshold voltage Vref (S12). If the discharge voltage Vbb of the battery pack 100 is lower than the threshold voltage Vref, an output voltage Vba of 0.5V or less is generated so that an amount of charge in the battery pack 100 is set as 0 (S14).

In contrast, if the discharge voltage Vbb of the battery pack 100 is higher than the threshold voltage Vref (312), the fluctuation width amplifier 110 amplifies a differential voltage between both voltages in a predetermined amplification ratio so as to generate an output voltage Vba obtained by amplifying the fluctuation width (slope) of the discharge voltage Vbb of the battery pack 100 as a large value and sets the amplified voltage Vba as an amount of charge of the battery pack 110 (S16). After performing steps S14 and S16, the fluctuation width amplifier 110 outputs the output voltage Vba having an amplified fluctuation width or the output voltage Vba of 0.5V or less to the display element 140 through the ADC 120 and the CPU 130 (S18). The amplified output voltage Vba is expressed as the amount of charge of the battery pack 100.

The fluctuation width of the discharge voltage from the battery pack 100 is amplified, and the amplified discharge voltage is expressed as an amount of charge based on steps S10-S18. Accordingly, an amount of charge of the battery pack is accurately measured.

Figure 13:
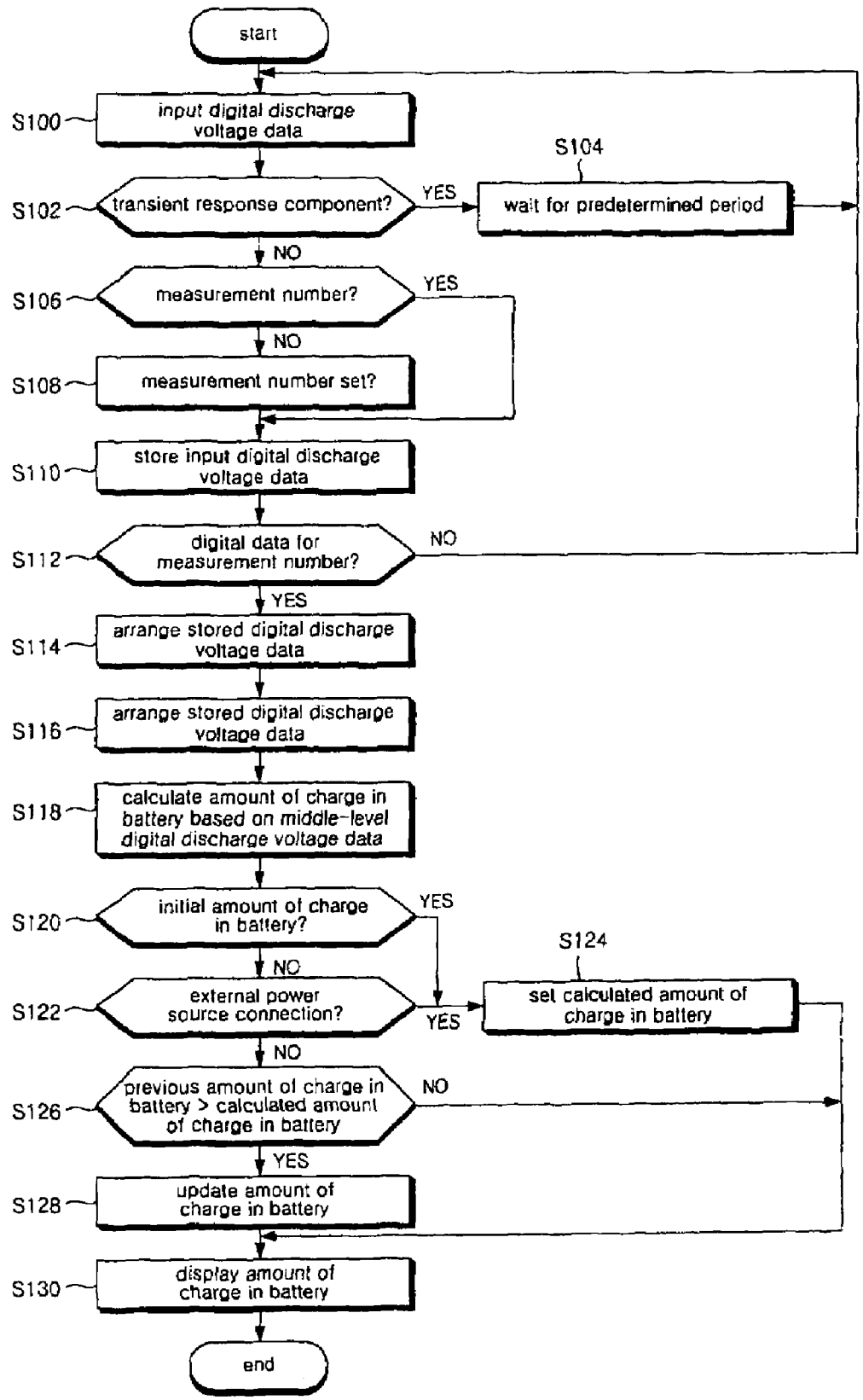
FIG. 13 is a flowchart of a process for measuring charge in a battery based on voltage.

Alternatively, referring to FIG. 13, when measuring an amount of charge in a battery based on voltage, one threshold voltage from a plurality of threshold voltages may be selected based on the type of battery. The selection of the threshold voltage may be included before the discharge voltage Vbb from the battery pack 100 is input to the fluctuation width amplifier 110 (S100). Thus, one of multiple threshold voltages may be set, so that it is possible to measure an amount of charge in a battery based on the discharge voltage regardless of the type of the battery, e.g., with respect to all types of batteries.

The CPU in either FIG. 3 or FIG. 9 may perform the measurement process of FIG. 13 within a predetermined period of time. Whenever a predetermined time interval elapses, e.g., a time interrupt is caused, the CPU 130 receives digital discharge voltage data corresponding to an amplified discharge voltage of the battery pack 100 from the ADC 120 (S100). The CPU 130 then checks a logical value of the input digital discharge voltage data, e.g., a discharge voltage having an amplified width, so as to determine whether the input digital discharge voltage data is a transient voltage (S102).

The CPU 130 determines whether the logical value of the input digital discharge voltage data is the maximum voltage level which can be output by the ADC 120 to determine if the input digital discharge voltage data is the transient voltage (S102). If the input digital discharge data is the logical value corresponding to the maximum voltage level of the ADC 120, the CPU 130 determines that the voltage from the battery pack 100 is in a transient response state. In this case, the CPU 130 waits in an idle state during a predetermined time interval (S104) and then returns to step S100. Through steps S102 and S104, only a transient noise component of the amplified discharge voltage of the battery pack 100 (digital discharge voltage data) is removed. Specifically, only an amplified discharge voltage of the battery pack 100 in which the transient noise component is removed undergoes sampling (or extraction).

If the digital discharge voltage data does not correspond to the transient voltage component (S102), the CPU 130 determines whether a measurement number for a battery voltage is set (S106). The CPU 130 determines whether there are registers allocated as buffers used for storing the digital discharge voltage data input from the ADC 120 among registers embedded in the CPU 130. If there is no register allocated as a buffer for storing the digital discharge voltage data, the CPU 130 specifies n registers, e.g., "n=10," among the registers embedded in the CPU as buffers for storing the digital discharge voltage data so as to set a measurement number for the digital discharge voltage data (S108).

In steps S106 and S108, an amount of samples used for unit measurement, or, a sample period for unit measurement, is set. Thus, the amount of samples used for unit measurement, or, the sample period for unit measurement, is set, so that a high-frequency noise component having intensity lower than the intensity of the transient response noise may be removed from the amplified discharge voltage of the battery pack 100 (or the digital discharge voltage data). In steps S106 through S108, it is possible to set the frequency range of high-frequency noises which can be removed from the amplified discharge voltage of the battery pack 100.

If the measurement number is set in step S106 or after step S108, the CPU 130 stores the input digital discharge voltage data in an empty buffer among measurement buffers specified by the CPU (S110). If there is no empty measurement buffer, the CPU 130 stores lately-input digital discharge voltage data in a buffer having the oldest digital discharge voltage data. In addition, if there is no empty measurement buffer, the CPU 130 clears m buffers, e.g., m=4, having the oldest digital discharge voltage data and then stores the lately-input digital discharge voltage in the cleared buffers. The CPU 130 next determines all specified registers, e.g., all allocated measurement buffers having digital discharge voltage data, to determine whether amplified discharge voltage of the battery pack 100 is measured by the measurement number (S112). The number of buffers cleared when the digital discharge voltage data is stored determines a unit measurement period. For example, if the number of the cleared buffers is "4," the amount of charge of the battery pack 100 is measured whenever digital discharge voltage data are input four times. In addition, through steps S110 and S112, samples for unit measurement, e.g., digital discharge voltage data, corresponding to an amount set in step S108 are collected.

If the discharge voltage of the battery pack 100 amplified by the measurement number is measured in step S112, the CPU 130 arranges digital discharge voltage data stored in the measurement buffers in ascending or descending order of voltage levels or in a suitable form (S114). A middle-level digital voltage is selected from the arranged digital discharge voltage data corresponding to the measurement number (S116). In steps S114 and S116, an average voltage of the digital discharge voltage data changed with the unit measurement period, i.e., an average voltage of the discharge voltage from the battery pack 100 changed with the unit measurement period, is detected. Accordingly, a high-frequency noise component within the frequency range set in step 108 is removed in steps S110 through S116.

The CPU 130 measures a percentage of charge of the battery pack 100 from a conversion table shown in FIG. 5 based on digital discharge voltage data corresponding to an average voltage (S118). In this case, the CPU 130 determines digital discharge voltage data exceeding 2.50V as a percentage of charge exceeding 85%. A digital discharge voltage data within the range of 2.50V to 1.90V is indicative of a percentage of charge within the range of 85% to 70%. A digital discharge voltage data within the range 1.90V to 1.60V is indicative of a percentage of charge within the range of 70% to 60%. A digital discharge voltage data within the range of 1.60V to 1.45V is indicative of a percentage of charge within the range of 60% to 50%. A digital discharge voltage data within the 1.45V to 1.30V is indicative of a percentage of charge within 50% to 40%. A digital discharge voltage data within the range of 1.30V to 1.15V is indicative of a percentage of charge within the range of 40% to 30%. A digital discharge voltage data of 1.00V or less is indicative of a percentage of charge of 20% or less.

The measurement method based on the digital discharge voltage data allows an amount of charge of the battery pack 100 to be precisely detected as compared with a method that expresses the digital discharge voltage data as the amount of charge.

After step S118, the CPU 130 determines whether an amount of charge in a battery is initially calculated by determining whether there is a previously calculated amount of charge (S120). The battery pack 100 is initially measured after power is supplied to a portable electronic instrument, for example, such as if the power of the portable electronic device is turned on.

If the previously calculated amount of charge is not the initially calculated amount of charge, the CPU 130 determines whether the external power source is connected (S122). The connection to the external power source is detected through management of a basic input/output system (BIOS) by the CPU 130. If there is no previously calculated amount of charge (S120), or if the connection to the external power source is detected (S122), the CPU 130 sets a reference amount of charge in a battery by storing the calculated amount of charge as an amount of charge of the battery pack 100 (S124). If the external power source is connected, the calculated amount of charge of the battery pack 100 is set as the reference amount of charge (an amount of current charge in the battery pack 100). A state where the battery pack 100 is charged by the external power source is indicated to a user.

In contrast, if the reference amount of charge in a battery is the previously calculated amount of charge in a battery, and if the external power source is not connected to the battery pack 100, the CPU 130 determines whether the reference amount of charge in the battery pack 100 is greater than the calculated amount of the charge in the battery pack 100 (S126). If the reference amount of charge in a battery is greater than the calculated amount of the charge in the battery pack 100, the CPU 130 lowers the reference amount of charge in a battery by one level, e.g., the reference amount of charge in a battery is lowered by 10% or 15% thereof. The lowered amount of charge is stored as a reference amount of charge in a register embedded in the CPU 130 (S128).

When the portable electronic instrument is driven by discharged power from the battery pack 100 instead of an external power source through steps S126 and S128, errors included in an amount of charge of the battery pack 100 are removed. When the portable electronic instrument is driven by the discharged power from the battery pack 100, the discharge voltage of the battery pack 100 may be abnormally raised. This abnormal increase of the discharge voltage from the battery pack 100 indicates that the amount of charge of the battery pack 100 may be measured as an amount greater than a real charge amount of the battery pack 100. The error of the measurement value for the amount of charge of the battery pack 100 due to the abnormal rising of the discharge voltage from the battery pack 100 may be removed in steps S126 through S128.

If a reference amount of charge is less than a calculated amount of charge in step S126, or after steps S124 and S128, the CPU 130 supplies the reference amount of charge to the display element 40 such that the reference amount of charge is displayed as a current amount of charge of the battery pack 100 (S130).

Figure 14:
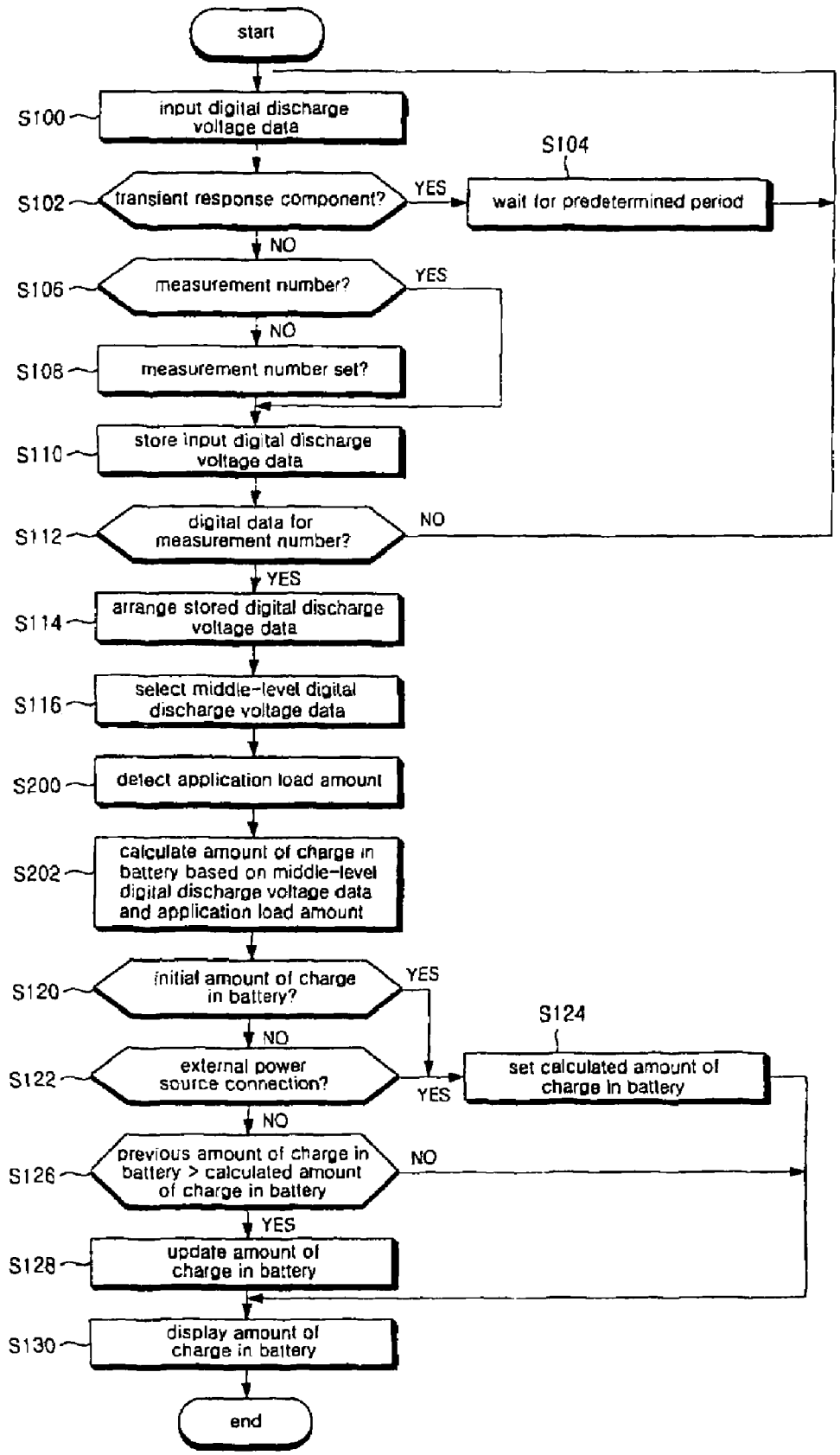
FIG. 14 is a flowchart of a method for measuring charge in a battery based on voltage.

Referring to FIG. 14, steps S200 and S202 replace step S118 of the process of FIG. 13. The remaining steps of FIG. 14 are substantially similar to the remaining steps of FIG. 13, so a description relating to steps S100 to S116 and steps S120 to S130 will be omitted.

Referring to FIG. 14, after step S116, the CPU 130 detects an amount of load (hereinafter, referred to as an "application load amount") due to any applications being managed (S200). The application load amount is detected by the application managing module 130A in the CPU 130. This application managing module 130A may be realized through an operational system program and a basic input/output system (BIOS) managed in the CPU 130. Next, the CPU 130 measures a percentage of charge of the battery pack 100 from the conversion table shown in FIG. 6 and based on the application load amount and the selected middle-level digital discharge voltage data (S202).

If the application load amount is 50% or less, the CPU 130 calculates the amount of charge of the battery pack 100 according to digital discharge voltage data as shown in FIG. 5. In contrast, if the application load amount corresponds to 50% or more, the CPU 130 determines digital discharge voltage data exceeding 1.90V as an amount of charge exceeding 85%. If the digital discharge voltage data is within the range of 1.90V to 1.45V, the percentage of charge is within the range of 85% to 70%. If the digital discharge voltage data is within the range of 1.45V to 1.30V, the percentage of charge is within the range of 70% to 60%. If the digital discharge voltage data is within the range of 1.30V to 1.15V, the percentage of charge is within the range of 60% to 50%. If the digital discharge voltage data is within the range of 1.15V to 1.00V, the percentage of charge is within the range of 50% to 40%. If the digital discharge voltage data is 1.00V or less, the percentage of charge is between 40% to 30%.

The method for measuring an amount of charge of the battery pack 100 allows a precise detection of the amount of charge of the battery pack 100 by compensating for a lowering the discharge voltage of the battery pack 100 if the application load amount is a large value. The amount of charge in the battery pack 100 may be more accurately measured by searching the conversion table for an amount of charge in a battery employing middle-level digital discharge voltage data and an application load amount as row and column addresses.

Accordingly, an amount of charge in a battery is measured based on the discharge voltage from the battery pack 100 and the application load amount. As described above, through one or more of the foregoing apparatus and a method for measuring an amount of charge in a battery based on voltage, it is possible to precisely measure an amount of charge of the battery pack by amplifying the fluctuation width of the discharge voltage from the battery pack. Furthermore, an amount of charge of the battery pack is measured by amplifying a fluctuation width of a discharge voltage from the battery pack, so an operation mode of a peripheral circuit module is accurately controlled.

Moreover, it is possible to more exactly measure an amount of charge of the battery pack by measuring the amount of charge based on the discharge voltage from the battery pack 100 and/or an application load amount.

Various modifications, additions and substitutions are possible. Accordingly, other implementations are within the scope of the following claims.

What is claimed is:

1. An apparatus for measuring residual charge in a battery, the apparatus comprising:
    a fluctuation width amplifier configured to amplify a fluctuation width of a discharge voltage from the battery in excess of a threshold voltage;

an operation module configured to calculate the amount of the residual charge in the battery based on the amplified discharge voltage by the fluctuation width amplifier and an application load amount; and a display module configured to display the amount of the residual charge in the battery, calculated by the operation module, wherein, in a condition in which the amplified discharge voltage is at a particular voltage and the particular voltage is lower than the discharge voltage, when the application load amount is equal to or less than a predetermined amount, the operation module calculates the amount of the residual charge that is lower than in a case where the application load amount exceeds in the predetermined amount.

2. The apparatus according to claim 1, wherein the display module comprises:

a display element;

an analog-digital converter configured to convert the discharge voltage having the fluctuation width amplified by the fluctuation width amplifier into digital discharge voltage data; and a driving unit configured to display the digital discharge voltage data from the analog-digital converter on the display element as the residual charge in the battery.

3. The apparatus according to claim 1, wherein the fluctuation width amplifier comprises:

a reference voltage source configured to generate the threshold voltage; and an operational amplifier configured to amplify a fluctuation width of a discharge voltage component of the battery, wherein the discharge voltage component has a voltage level higher than the threshold voltage from the reference voltage source.

4. The apparatus according to claim 1, wherein the fluctuation width amplifier comprises:

a reference voltage source configured to generate the threshold voltage; and a transistor coupling circuit configured to amplify a fluctuation width of a discharge voltage component from the battery, wherein the discharge voltage component is higher than the threshold voltage from the reference voltage source.

5. The apparatus according to claim 1, wherein the fluctuation width amplifier comprises:

at least two reference voltage sources configured to generate threshold voltages having different voltage levels;

a selection unit configured to select a threshold voltage from at least one of the reference voltage sources based on a battery characteristic; and an operational amplifier configured to amplify a fluctuation width of a discharge voltage component from the battery, wherein the discharge voltage component is higher than the threshold voltage selected by the selection unit.

6. The apparatus according to claim 1, wherein the fluctuation width amplifier comprises:

at least two reference voltage sources configured to generate threshold voltages having different voltage levels;

a selection unit configured to select a threshold voltage from at least one of the reference voltage sources based on a battery characteristic; and a transistor coupling circuit configured to amplify a fluctuation width of a discharge voltage component from the battery, wherein the discharge voltage component is higher than the threshold voltage from the selection unit.

7. The apparatus according to claim 1, wherein the operation module comprises:

an analog-digital converter configured to convert the amplified discharge voltage into digital discharge voltage data; and a processor configured to calculate the amount of the residual charge in the battery based on the digital discharge voltage data from the analog-digital converter.

8. The apparatus according to claim 7, wherein the processor is configured to calculate the residual charge based on a conversion table, wherein the conversion table includes digital discharge voltage data in relation to a corresponding percentage of residual charge.

9. The apparatus according to claim 8, wherein the display module is configured to display the percentage of residual charge.

10. The apparatus according to claim 1, further comprising an application management module configured to detect an application load amount based on an operating program operatively driven by the battery, wherein the operation module is configured to calculate the amount of residual charge in the battery based on application load amount as well as the amplified discharge voltage amplified.

11. The apparatus according to claim 10, wherein the operation module comprises:

an analog-digital converter configured to convert the amplified discharge voltage into digital discharge voltage data; and a processor configured to calculate the residual charge based on the application load amount and the digital discharge voltage data from the analog-digital converter.

12. The apparatus according to claim 11, wherein the processor is configured to calculate the residual charge based on a conversion table, wherein the conversion table includes digital discharge voltage data and application load amount data in relation to a corresponding percentage of residual charge.

13. The apparatus according to claim 12, wherein the display element is configured to display the percentage of residual charge.

14. The apparatus according to claim 1, wherein the amplified discharge voltage falls within a range from 0.5V to 4V.

15. A method for measuring an amount of residual charge in a battery, the method comprising:

amplifying a fluctuation width of the discharge voltage of a battery;

calculating the residual charge in the battery based on a discharge voltage having the amplified fluctuation width and an application load amount; and displaying the amount of the residual charge, wherein, in a condition in which the amplified discharge voltage is at a particular voltage and the particular voltage is lower than the discharge voltage, when the application load amount is equal to or less than a predetermined amount, the amount of the residual charge is calculated that is lower than in a case where the application load amount exceeds in the predetermined amount.

16. The method according to claim 15, wherein amplifying the fluctuation width of a discharge voltage of a battery further comprises:

selecting a specific threshold voltage from at least two available threshold voltages having different voltage levels, wherein the threshold voltages are based on a characteristic of the battery and are selected before the discharge voltage of the battery is inputted to the measurement device.

17. The method of claim 15, wherein amplifying the fluctuation width of a discharge voltage of a battery comprises:

inputting a discharge voltage of the battery to a measurement device;

comparing the discharge voltage of the battery with a threshold voltage;

setting the residual charge in the battery as "0" if the discharge voltage of the battery is less than the threshold voltage;

amplifying a fluctuation width of the discharge voltage of the battery if the discharge voltage of the battery is the threshold voltage or more than the threshold voltage.

18. The method according to claim 15, further comprising removing a noise component from a discharge voltage having the amplified fluctuation width, wherein calculating the residual charge is performed based on the discharge voltage having the amplified fluctuation width with the removed noise component.

19. The method according to claim 18, further comprising correcting errors in the residual charge.

20. The method according to claim 18, wherein removing the noise component comprises:

removing a transient response component included in the discharge voltage having the amplified fluctuation width; and removing a high frequency noise component that is lower than the transient response component and which does not include a separate transient response component.

21. The method according to claim 19, wherein correcting the errors comprises:

comparing a current calculated amount of residual charge with a previously calculated amount of residual charge; and disregarding the current calculated amount of residual charge that is greater than the previously calculated amount of residual charge.

22. The method according to claim 18, wherein calculating the residual charge comprises searching a conversion table for a percentage of residual charge corresponding to the discharge voltage.

23. The method according to claim 15, further comprising:

determining if an external power source is connected to a portable electronic instrument operatively connected with the battery; and correcting errors included in a calculation of the residual charge if the external power source is not connected to the portable electronic instrument.

24. The method according to claim 23, wherein correcting the errors comprises:

comparing a current calculated amount of residual charge with a previously calculated amount of residual charge if the external power source is not connected to the portable electronic instrument; and disregarding the current calculated amount of residual charge greater than the previously calculated amount of residual charge.

25. The method according to claim 24, wherein displaying the amount of the residual charge comprises:

displaying the current calculated amount of residual charge if the external power source is connected to the portable electronic instrument; and displaying a percentage of residual charge if the external power source is not operatively connected to the portable electronic instrument.

26. The method according to claim 23, wherein calculating the residual charge comprises searching a conversion table for a percentage of residual charge corresponding to the discharge voltage.

27. A portable electronic instrument for measuring residual charge in a battery, the portable electronic instrument comprising:

a peripheral circuit module configured to be driven by a discharge voltage from the battery;

a display element configured to display an operation state of the peripheral circuit module;

a fluctuation width amplifier configured to amplify a fluctuation width of a discharge voltage from the battery in excess of a threshold voltage; and a controller configured to display the residual charge in the battery on the display element and to control an operation mode of the peripheral circuit module based on the discharge voltage having the amplified fluctuation width and an application load amount, wherein, in a condition in which the discharge voltage having the amplified fluctuation width is at a particular voltage and the particular voltage is lower than the discharge voltage, when the application load amount is equal to or less than a predetermined amount, the controller displays the amount of the residual charge that is lower than in a case where the application load amount exceeds the predetermined amount.

28. The portable electronic instrument according to claim 27, wherein the controller comprises:

an analog to digital converter configured to convert the discharge voltage having the fluctuation width amplified by the fluctuation width amplifier into digital discharge voltage data; and a processor configured to display the residual charge in the battery on the display element and to control an operation mode of the peripheral circuit module based on the digital discharge voltage data from the an analog-digital converter.

29. The portable electronic instrument according to claim 27, wherein the fluctuation width amplifier comprises:

a reference voltage source configured to generate the threshold voltage; and an operational amplifier configured to amplify a fluctuation width of a discharge voltage component of the battery, wherein the discharge voltage component is higher than the threshold voltage from the reference voltage source.

30. The portable electronic instrument according to claim 27, wherein the fluctuation width amplifier comprises:

a reference voltage source configured to generate the threshold voltage; and a transistor coupling circuit configured to amplify a fluctuation width of a discharge voltage component from the battery, wherein the discharge voltage component is higher than the threshold voltage from the reference voltage source.

31. The portable electronic instrument according to claim 27, wherein the fluctuation width amplifier comprises:

at least two reference voltage sources configured to generate threshold voltages having different voltage levels;

a selection unit configured to select a threshold voltage from at least two reference voltage sources based on a characteristic of the battery; and an operational amplifier configured to amplify a fluctuation width of a discharge voltage component from the battery, wherein the discharge voltage component is higher than the threshold voltage from the selection unit.

32. The portable electronic instrument according to claim 27, wherein the fluctuation width amplifier comprises:

at least two reference voltage sources configured to generate threshold voltages having different voltage levels;

a selection unit configured to select a threshold voltage from at least two reference voltage sources based on a characteristic of the battery; and a transistor coupling circuit configured to amplify a fluctuation width of a discharge voltage component from the battery, wherein the discharge voltage component is higher than the threshold voltage from the selection unit.

33. The portable electronic instrument according to claim 27, wherein the controller configured to correct errors included in a calculated amount of the residual charge, and to control an operation mode of the peripheral module based on the corrected amount of the residual charge.

34. The portable electronic instrument according to claim 33, wherein the controller comprises:

an analog to digital converter configured to convert the discharge voltage having the fluctuation width amplified by the fluctuation width amplifier into digital discharge voltage data; and a processor configured to display the residual charge in the battery on the display element and to control an operation mode of the peripheral circuit module based on the digital discharge voltage data from the an analog-digital converter.

35. The portable electronic instrument according to claim 34, wherein the processor is configured to calculate the amount of the residual charge in the battery by searching a conversion table, wherein the conversion table includes digital discharge voltage data in relation to a corresponding percentage of residual charge.

36. The portable electronic instrument according to claim 34, wherein the processor is configured to remove a noise component included in the digital discharge voltage data received from the analog-digital converter prior to calculating the amount of the residual charge.

37. The portable electronic instrument according to claim 27, further comprising an application management module configured to detect an application load amount doe to an operative application in the portable electronic instrument, wherein the controller configured to calculate the amount of residual charge in the battery based on the application load amount as well as the amplified discharge voltage, to correct errors included in the calculated amount of the residual charge, and to control an operation mode of the peripheral module based on the corrected amount of the residual charge.

38. The portable electronic instrument according to claim 37, wherein the controller comprises:

an analog to digital converter configured to convert the discharge voltage having a fluctuation width amplified by the fluctuation width amplifier into digital discharge voltage data; and a processor configured to calculate the amount of the residual charge in the battery based on the digital discharge voltage data from the analog-digital converter and the application load amount, to correct errors included in the calculated amount of the residual charge if the peripheral circuit module is driven by the discharge voltage of the battery, and to control an operation mode of the peripheral module based on the corrected amount of the residual charge.

39. The portable electronic instrument according to claim 38, wherein the processor is configured to calculate the amount of the residual charge in the battery by searching a conversion table, wherein the conversion table includes digital discharge voltage data and application load amount data in relation to a corresponding percentage of residual charge.

40. The portable electronic instrument according to claim 39, wherein the processor is configured to remove a noise component included in the digital discharge voltage data from the analog-digital converter before calculating the amount of the residual charge.

41. A portable electronic instrument for measuring an amount of residual charge in a battery, the portable electronic instrument comprising:

a peripheral circuit module operatively driven by a discharge voltage from the battery and an external voltage from an external instrument;

a display element configured to display an operation state of the peripheral circuit module;

a fluctuation width amplifier configured to amplify a fluctuation width of a discharge voltage from the battery in excess of a threshold voltage; and an controller configured to calculate the residual charge in the battery based on a discharge voltage amplified by the fluctuation width amplifier and an application load amount, to display the residual charge in the battery on the display element and to control an operation mode of the peripheral circuit module based on the discharge voltage having the amplified fluctuation width, wherein, in a condition in which the amplified discharge voltage is at a particular voltage and the particular voltage is lower than the discharge voltage, when the application load amount is equal to or less than a predetermined amount, the controller calculates the amount of the residual charge that is lower than in a case where the application load amount exceeds the predetermined amount.

42. The portable electronic instrument according to claim 41, wherein the controller comprises:

an analog-digital converter configured to convert the amplified discharge voltage having a fluctuation width amplified by the fluctuation width amplifier into digital discharge voltage data; and a central processing unit configured to calculate the amount of the residual charge in the battery based on the digital discharge voltage data from the analog-to-digital converter, to correct errors included in the calculated amount of the residual charge if the peripheral circuit module is driven by the discharge voltage of the battery, and to control an operation mode of the peripheral circuit module based on the corrected amount of the residual charge.

43. The portable electronic instrument according to claim 42, wherein the central processing unit is configured to calculate the amount of the residual charge in the battery by searching a conversion table, wherein the conversion table includes digital discharge voltage data in relation to a corresponding percentage of residual charge.

44. The portable electronic instrument according to claim 42, wherein the central processing unit is configured to remove a noise component included in the digital discharge voltage data from the analog to digital converter before the amount of the residual charge is calculated by the central processing unit.

45. The portable electronic instrument according to claim 41, wherein the controller is configured to display the calculated amount of the residual charge as the amount of the residual charge in the battery if the peripheral circuit module is driven by the external voltage.

46. The portable electronic instrument according to claim 41, further comprising an application management module configured to detect an application load amount due to an operative application in the portable electronic instrument, wherein the controller configured to calculate the amount of the residual charge in the battery based on the application load amount as well as the amplified discharge voltage, to correct errors included in the calculated amount of the residual charge if the peripheral circuit module is driven by the discharge voltage of the battery, and to control an operation mode of the peripheral module based on the corrected amount of the residual charge.

47. The portable electronic instrument according to claim 46, wherein the controller comprises:
- an analog-to-digital converter configured to convert the discharge voltage having a fluctuation width amplified by the fluctuation width amplifier into digital discharge voltage data; and
- a central processing unit configured to calculate the amount of the residual charge in the battery based on the digital discharge voltage data from the analog to digital converter and the application load amount, to correct errors included in the calculated amount of the residual charge if the peripheral circuit module is driven by the discharge voltage of the battery, and to control an operation mode of the peripheral module based on the corrected amount of the residual charge.

48. The portable electronic instrument according to claim 47, wherein the central processing unit is configured to calculate the amount of the residual charge in the battery by searching a conversion table, the conversion table including digital discharge voltage data and application load amount data in relation to a corresponding percentage of residual charge.

49. The portable electronic instrument according to claim 48, wherein the central processing unit is configured to remove noises included in the digital discharge voltage data from the analog to digital converter before calculating the amount of the residual charge.

50. The portable electronic instrument according to claim 46, wherein the controller is configured to display the calculated amount of the residual charge as the amount of the residual charge in the battery if the peripheral circuit module is driven by the external voltage.

* * * * *